Figure 1:
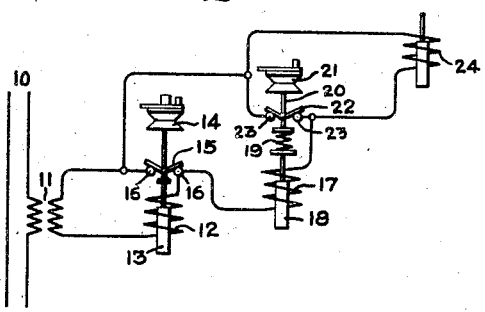

D. BASCH.
PROTECTIVE DEVICE.
APPLICATION FILED JUNE 17, 1913.

1,154,359.

Patented Sept. 21, 1915.

Witnesses

Inventor
David Basch
by Albert G. Davis
His Attorney

UNITED STATES PATENT OFFICE.

DAVID BASCH, OF SCHENECTADY, NEW YORK, ASSIGNOR TO GENERAL ELECTRIC COMPANY, A CORPORATION OF NEW YORK.

PROTECTIVE DEVICE.

1,154,359.                    Specification of Letters Patent.    Patented Sept. 21, 1915.

Application filed June 17, 1913. Serial No. 774,092.

*To all whom it may concern:*

Be it known that I, DAVID BASCH, a citizen of the United States, residing at Schenectady, in the county of Schenectady, State of New York, have invented certain new and useful Improvements in Protective Devices, of which the following is a specification.

My invention relates to protective devices for electric circuits and more especially to protective devices which have a time lag or time limit.

In protecting electric circuits against the effects of overload and of similar abnormal conditions it is desirable that the protective devices operate after a comparatively long period in case the overload is slight, but very quickly in case the overload or other abnormal condition is severe. The desired operation of the protective device after a period of time which is an inverse function of the overload or other abnormal condition can be secured by various forms of relays and similar devices. In many systems a number of circuit breakers are connected in series, and these circuit breakers must open automatically in response to overload and in a definite and unvarying sequence, with a suitable time interval between the opening of one circuit breaker and the opening of the next, so that as small a part of the system as possible will be disconnected as a result of overload. The circuit breakers can be tripped in the desired sequence by the usual inverse time limit elements as long as the overload or other abnormal condition is within certain limits, but when the overload becomes very great the inverse time elements lose their time lag and all respond in about the same length of time, regardless of the order in which they respond to comparatively slight overloads, so that the circuit breakers are all tripped out at the same time, or even in the wrong sequence.

The object of my invention is to provide a protective device which will retain certain characteristics and the desired selective action on all overloads, however severe. Another object is to provide a device which responds to overloads below a certain limit in a time which varies inversely as the extent of the overload, and to overloads above that limit in a definite and predetermined time. A further object is to provide means by which a series of circuit breakers can be tripped by means of inverse time limit elements and yet will always open in a definite sequence and with a definite and predetermined time interval between the opening of one circuit breaker and the next, regardless of the magnitude of the disturbance, so that both the desired inverse time limit action and dependable selective tripping of the circuit breakers can be secured.

In carrying out my invention I directly control each circuit breaker by some suitable form of time limit mechanism which has a definite and characteristic action when set in operation, and is shielded from any disturbance of its action by abnormal conditions on the circuit to be protected. This mechanism is set in action when abnormal conditions occur in the circuit to be protected, but responds indirectly to those conditions, as it is controlled and set in operation by a separate device which is directly responsive to conditions on the circuit. The time lag of these time limit mechanisms differs in such a manner that even though all start at once the circuit breakers will be tripped out in a certain definite order. Where the desired sequence of tripping is secured by the use of definite time limit tripping mechanisms, these mechanisms are not directly responsive to overloads and other abnormal conditions on the circuit, but are set into operation by inverse time limit elements which respond directly to conditions in the circuit and operate slowly and in definite sequence when the overload is below a definite limit. If the disturbance is very great all of the inverse time elements operate practically simultaneously and set all of the definite time limit mechanisms into operation simultaneously, but as each mechanism has a time lag different from that of the next, the circuit breakers will nevertheless be tripped out in a definite and predetermined order.

My invention will best be understood in connection with the accompanying drawing, which merely for illustration shows some of the various forms in which my invention may be embodied, and in which—

Figure 2:
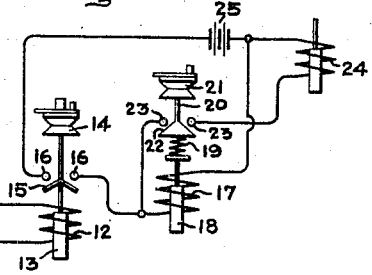
Figure 3:
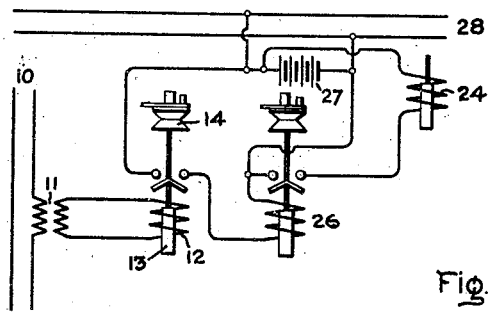
Figure 4:
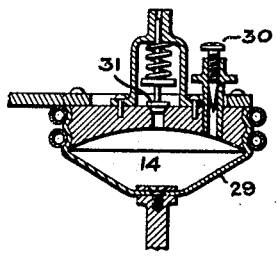
Figure 5:
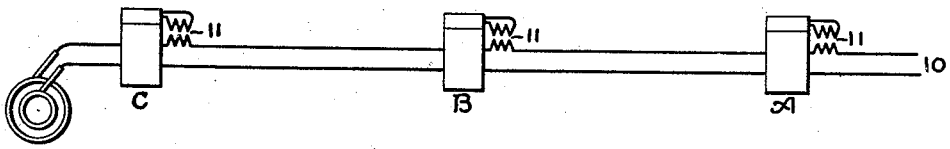
Figure 6:
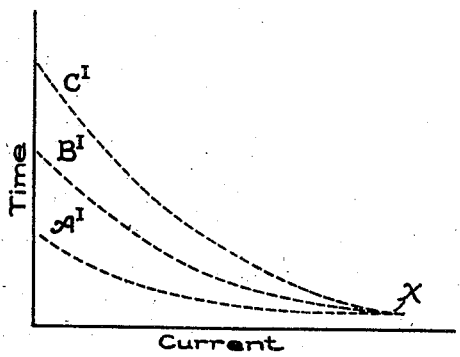
Figure 7:
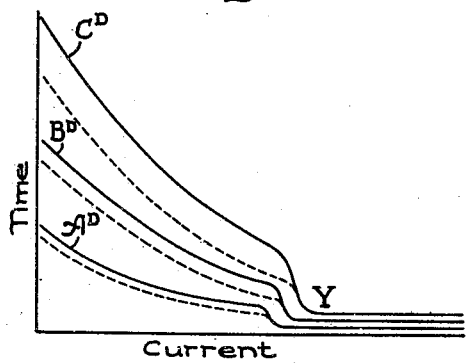

Figure 1 is a diagram illustrating one form of embodiment of my invention; Fig. 2 is a diagram illustrating another modification; Fig. 3 is a diagram illustrating a third form in which the invention may be embodied; Fig. 4 is a sectional view of one form of retarding device which may be used to secure the time limit action; Fig. 5 is a diagram illustrating the principle of my invention as applied to a distribution system; and Figs. 6 and 7 are curves for illustrating the action of devices embodying my invention.

In the particular form of device shown in Fig. 1, the circuit 10 is the electric circuit which is to be protected. Abnormal conditions in this circuit, such as overload, affect the protective devices in any suitable manner, as, for example, through a current transformer 11, which supplies current to the device which is directly responsive to conditions in the circuit 10. In the particular arrangement shown the current transformer 11 is connected to an inverse time element comprising a winding 12 which subjects a movable member, such as the core 13, to a thrust dependent upon the extent of overload or other disturbance in the circuit 10. The movement of the core 13 is controlled by some suitable retarding device, such as a bellows 14, so constructed as to permit the core 13 to reach operative position in a period of time which is an inverse function of the extent of the disturbance on the circuit 10. When the core 13 reaches operative position it sets in operation a suitable form of definite time limit mechanism which will operate to trip open the circuit breaker and thereby open the circuit 10 a definite and uniform period of time after the mechanism is started into operation. In the particular arrangement shown, the core 13 controls a movable contact 15 that is normally in engagement with stationary contacts 16 and is lifted away from those contacts to energize the definite time limit mechanism. The contact 15 is not lifted immediately upon movement of the core 13 because of the bellows 14 and a lost motion connection between the core and contact. In the particular relay shown the stem on the core extends loosely through the contact, which is lifted by a shoulder on the stem. This shoulder is normally some distance below the contact. The time lag between the initial movement of the core and the lifting of the contact 15 depends on the time required for the core to traverse this distance between the shoulder and the contact, and this time is determined by the bellows 14. After the shoulder engages the contact 15 further movement of the core separates the contacts 15 and 16 and thereby causes current to flow through a definite time limit mechanism. The particular form of definite time limit mechanism shown in Fig. 1 is a definite time limit relay comprising a winding 17 which normally is not energized. When the inverse time element reaches operative position and separates the contacts 15 and 16 the winding 17 of the definite time limit mechanism is energized, and the movable member or core 18 is moved, compressing the spring 19, which then exerts a definite and uniform thrust upon a circuit-controlling member 20, the movement of which is retarded by some suitable time limit or retarding device. The particular form of retarding device shown is a bellows 21 so adjusted as to permit the member 20 to move at a definite and uniform rate. When the member 20 reaches the end of its upward movement it actuates the coöperating contacts 22 and 23 to energize the trip coil 24, whereupon the automatic circuit breaker, not shown, is tripped and the circuit 10 is opened.

The circuit 10 is not opened until a definite and certain period of time after the definite time limit mechanism is started into operation. Since the definite time limit mechanism cannot start until the inverse time element is operated, the time which elapses between the appearance of the overload or other abnormal condition on the circuit 10 and the opening of the circuit is in any case the length of time required for the definite time limit mechanism to operate, and is much greater when the overload is comparatively slight as on a slight overload the inverse time element requires some time to reach operative position. The time limit or time lag of the device as a whole is therefore the sum of the time required for the inverse time element to operate and of the definite and fixed period required for the definite time limit mechanism to reach tripping position. The device therefore has the inverse time action on all overloads and similar abnormal conditions below a predetermined limit, and a definite time limit action on all overloads and abnormal conditions above that limit.

In the modification shown in Fig. 2 the connections are substantially the same as shown in Fig. 1, with the exception that the energy for the trip coil 24 is derived from some local source, such as the battery 25, instead of from the current transformer 11, as shown in Fig. 1. In other respects the connections and operations are the same in both figures.

In Fig. 3 I have shown diagrammatically a modification in which the trip coil 24 is controlled by an inverse time limit relay 26 which is a duplicate of the inverse time limit relay connected to the circuit 10 through the transformer 11. The relay 26 is energized from some source of constant potential, such as a storage battery 27, floating upon a suitable supply circuit 28 which may, for example, be the exciter circuit. The time element 26 is not directly responsive to conditions on the circuit 10, but is set in operation when its energizing coil is connected to the source of constant potential 27. Since the potential supplied to the actuating coil of the time element 26 is always the same, the time lag of the time element 26 will always be definite and certain.

The time element 26 is set in operation by an inverse time relay like that shown in Fig. 1, connected so as to be directly responsive to conditions in the circuit 10. Even though the abnormal condition or overload upon the circuit 10 is very great, so that the inverse time relay operates almost instantaneously instead of with the desired time lag, it does not directly energize the trip coil 24, but merely closes the energizing circuit of the time limit element 26, which eventually, at a definite and certain time after being energized, closes the circuit of the trip coil 24 and thereby opens the main circuit 10. The two relays shown in Fig. 3 are identical in construction so that by my invention the desired result may be obtained by using two standard inverse time limit relays.

An example of a system in which my invention may be advantageously employed is shown diagrammatically in Fig. 5, in which the automatic switches or circuit breakers A, B and C are connected in series in the circuit 10 and each rendered responsive to abnormal conditions in the circuit by some suitable connection, such as the current transformer 11. In such an arrangement it is desirable that upon the occurrence of a short circuit, overload or similar abnormal condition, the circuit breaker A will first open; then after a suitable interval, the circuit breaker B; and finally, if the trouble still continues, the circuit breaker C will open to protect the generator. This sequence in the tripping of the circuit breakers could be secured on comparatively slight overload by the inverse time elements alone, as shown by the curves in Fig. 6. For example, by proper setting of the inverse time elements, the circuit breaker A will trip two seconds, the circuit breaker B four seconds, and the circuit breaker C six seconds after the appearance of a slight overload. The difficulty is that as the overload increases, the inverse time elements all operate more quickly than they should, as appears from the curves A$^I$, B$^I$ and C$^I$ in Fig. 6, until finally when the current reaches the very great value represented by X in Fig. 6, all of the inverse time elements operate practically in the same time interval regardless of their setting, so that all of the circuit breakers A, B and C will trip out simultaneously. By my invention the desired sequence in the tripping of the circuit breakers is secured even after the current exceeds the point X because the definite time limit mechanisms always have the same time lag regardless of the amount of current.

In order to avoid the danger that upon very heavy overload the inverse time element of the circuit breaker B, for example, will disregard its setting to such an extent that it reaches operating position before the inverse time element of the circuit breaker A, I convert the inverse time element into an instantaneously acting relay before the current reaches such a dangerous value. This result may be obtained in various ways, but in the preferred construction I automatically disable the retarding device which controls the movable member of the inverse time element whenever the overload exceeds a predetermined limit. In the preferred construction of retarding device, as best shown in Fig. 4, the fluid containing chamber or bellows has a flexible wall 29 connected to the movable member 13 of the inverse time element. An adjustable escape valve 30 is provided to enable the time lag to be varied at will, and in addition a safety valve 31 automatically opens when the pressure in the chamber 14 exceeds a predetermined amount, whereupon the contents of the chamber can escape freely and the movable member of the inverse time element can move instantaneously. By setting the safety valves 31 so that this conversion of the inverse time element into an instantaneously acting relay takes place before the overload reaches a dangerous amount which might cause the inverse time elements to operate in the wrong sequence all possibility of the circuit breakers tripping in the wrong order is avoided.

The action of a protective device embodying my invention is shown by the curves in Fig. 7, in which the doted lines represent the curves of the inverse time elements, and the full lines A$^D$, B$^D$ and C$^D$ are the curves of the definite time limit tripping mechanisms as controlled by the inverse time elements. The inverse time elements are so arranged that when the current reaches a predetermined value, as, for example, in the neighborhood of the value Y, the safety valves 31 begin to open. The safety valve on the inverse time element of the circuit breaker A may open first, then the safety valve on circuit breaker B, etc., or all may open simultaneously, in which case all of the definite time limit mechanisms are started simultaneously. Owing to the different time lag of the definite time limit mechanisms, the circuit breaker A will first trip out; then the circuit breaker B will open a definite and certain interval of time later; and finally, after another certain and definite interval of time, the circuit breaker C will open.

By my invention I provide a time limit relay which is an inverse time limit relay on all overloads below a predetermined limit and is a definite time limit relay on all overloads above that limit. As a result of this characteristic a series of circuit breakers controlled by devices embodying my invention will always be tripped out in the desired sequence even though the overload is so severe that the inverse time relays having widely differing time lags all operate in substantially the same length of time and would trip out all the circuit breakers simultaneously or even in the wrong sequence were it not for the definite time limit tripping mechanisms automatically brought into action by the inverse time elements.

My invention may be embodied in many other forms than that shown and described and I therefore do not desire to limit my invention to the precise arrangement disclosed, since various modifications will suggest themselves to those skilled in the art without departing from the spirit of my invention, the scope of which is set forth in the annexed claims.

What I claim as new and desire to secure by Letters Patent of the United States, is:

1. A time limit device for controlling an electric circuit comprising time limit trip mechanism operative to open the circuit at a definite and uniform time interval after being set in operation, and inverse time limit means responsive to an abnormal condition in said circuit for setting said mechanism in operation after a period of time which is an inverse function of the extent of such abnormal condition.

2. The combination with an automatic switch for opening an electric circuit, of means responsive to current in the circuit and movable into operative position in a period of time which is an inverse function of the current and a time limit trip mechanism set in operation by said means to trip said switch open a certain period of time after said means reaches operative position.

3. A time limit device for controlling an electric circuit comprising a time limit tripping relay for opening the circuit and normally independent of conditions in said circuit, an inverse time limit relay directly responsive to abnormal conditions in the circuit, and connections for setting said time limit relay in operation when said inverse time limit relay reaches operative position.

4. A time limit device for controlling an electric circuit comprising a time limit tripping relay having a normally open energizing circuit, and an inverse time limit relay responsive to an abnormal condition in the electric circuit for closing said energizing circuit after a period of time inversely dependent on the extent of such abnormal condition.

5. A time limit device for controlling an electric circuit comprising time limit trip mechanism operative to open the circuit a certain time interval after being set in operation, and inverse time limit means for setting said mechanism in operation, said means being quickly responsive to an abnormal condition which exceeds a predetermined limit and responsive to an abnormal condition within said limit after a period of time which is an inverse function of the extent of said abnormal condition.

6. In a time limit device for controlling an electric circuit, the combination with a definite time element for opening the circuit comprising a retarded member movable at a definite rate under all conditions, of an inverse time element for setting said definite time element in operation and comprising a retarded member movable in response to an abnormal condition on the circuit at a rate inversely dependent on the extent of said condition, and means for permitting said retarded member to move freely when the extent of said abnormal condition exceeds a predetermined limit.

7. In a time limit device for controlling an electric circuit, the combination with a definite time element for opening the circuit, and comprising a member movable when said element is set in operation, and retarding means for causing said member to move at a uniform rate under all conditions, of an inverse time element for setting said definite time limit element in operation comprising a member movable in response to abnormal conditions on the circuit, retarding means for causing said member to move at a rate which is an inverse function of the extent of said abnormal condition, and means for rendering said retarding means inoperative when said abnormal condition exceeds a predetermined limit.

8. In a time limit device for controlling electric circuits, the combination with a definite time element for opening the circuit at a definite and uniform time interval after being set in operation, of an inverse time element for setting said definite time element in operation comprising a movable member, means for exerting upon said member a thrust dependent in amount upon the extent of an abnormal condition on the circuit, a fluid containing chamber for retarding the movement of said member, means for obstructing the escape of fluid from said chamber, and means actuated by a thrust upon said member which exceeds a predetermined limit to permit free escape of the contents of said chamber.

9. The combination with an electric switch having a trip coil for opening the switch when energized, of a definite time relay for energizing said trip coil a uniform interval of time after being set in operation, and an inverse time relay responsive to conditions on the circuit through the switch for setting said definite time element in operation after a period of time which is an inverse function of the extent of said abnormal condition on said circuit.

In witness whereof, I have hereunto set my hand this 16th day of June, 1913.

DAVID BASCH.

Witnesses:
BENJAMIN B. HULL,
HELEN ORFORD.